United States Patent Office 3,572,233
Patented Mar. 23, 1971

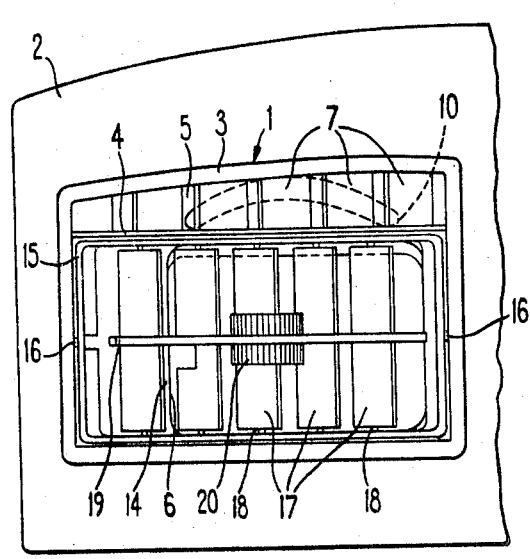
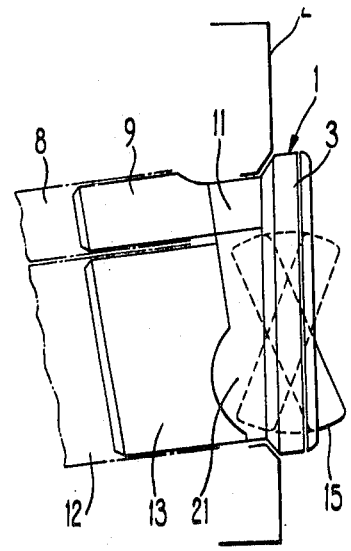
FIG.1  FIG.2
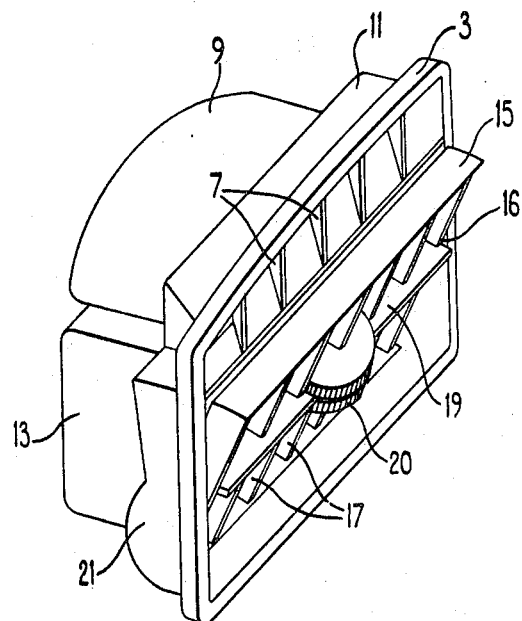
FIG.3

3,572,233
VENTILATION AND DEFROST-AIR-DUCT-OUTLET FOR AUTOMOBILES
Alfons Bar, Russelsheim am Main, and Wolfgang Jobst, Pfungstadt, Germany, assignors to General Motors Corporation, Detroit, Mich.
Filed Nov. 19, 1969, Ser. No. 877,898
Claims priority, application Germany, Dec. 3, 1968, P 18 12 283.3
Int. Cl. F24f 7/04
U.S. Cl. 98—2　　　　　　　　　　　　　　　　2 Claims

ABSTRACT OF THE DISCLOSURE

A ventilation and defrost air-duct-outlet comprises a first duct part connectable to a heated air supply, a second duct part connectable to a fresh air supply; and an outlet louvre assembly having fixed louvres opposite the first duct part, and having opposite the second duct part a rectangular frame containing louvres pivotable about an axis transverse to the axis of the louvres. The louvres in the frame are connected for simultaneous pivoting by a web at right angles to the louvres.

This invention relates to ventilation and defrost air-duct-outlets for automobiles.

An object of this invention is to provide such air-duct-outlets by which defrosting of the automobile side-windows may be maintained by a stream of heated air, while permitting change in direction of a separate stream of air for ventilating and/or heating the passenger compartment.

Other objects and advantages of the invention will be readily appreciated by reference to the following detailed description when considered in connection with the accompanying drawings, wherein:

FIG. 1 is a front elevation of a ventilation and defrost air-duct-outlet according to the invention;

FIG. 2 is a side elevation of the embodiment shown in FIG. 1;

FIG. 3 is a perspective view of the same embodiment from an oblique direction.

The ventilation and defrost air-duct-outlet 1 is secured in suitable manner in an automobile instrument panel 2. Appropriately, it consists of a plastics material and is provided with a duct-end frame 3 protruding slightly from the instrument panel 2. By means of a web 4, the area formed by the duct-end frame 3 is divided into an upper smaller area 5 and a lower larger area 6. In the portion 5 assigned to the heating line, there are fixed louvres 7 which are obliquely arranged in such a way that the air stream coming from the heating line is directed towards the side windows (not shown) of the automobile. The hose of the heating line is denoted by 8. The cross-section of this hose is matched to the cross-section of the connection branch 9 of duct 1. The cross-section is somewhat in the shape of a circular segment, as revealed by line 10 in FIG. 1 and FIG. 3. A chamber 11 between the connection branch 9 and frame 3 forms the transition from the cross-section of connection branch 9 to the area 5 in which the louvres 7 are arranged.

The larger area 6 is assigned to the fresh air line, whose hose is designated by 12. The fresh air line is directly in communication with an air collecting box (not shown) so that the inflowing air does not need to overcome the flow resistance of a heat exchanger. However, the fresh air line may also receive air via a heat exchanger (not shown) if this is desirable. The hose 12 of the fresh air line is linked with the connecting branch 13 of air duct 1. The connecting branch 13 and hose 12 have a rectangular cross-section with sharply rounded corners. The cross-section line of the connecting branch 13 is denoted by 14 in FIG. 1.

Inside the rectangular duct-end area 6 formed by frame 3 and web 4, there is a rectangular frame 15 which is mounted to swivel by means of pivot pins 16. In frame 15 there are louvres 17 which are pivotable in frame 15 about pivotal points 18. The individual louvres 17 are connected together through a web 19 which fulfils two tasks. Firstly it serves as an air-directing baffle and secondly, by its displacement, it brings about a uniform swivelling movement of the louvres 17 which are partly slotted to give passage to web 19. The middle louvre 17 is provided with a manipulator 20 which, in the example, is formed by two small toothed wheels firmly connected to the plate. If the middle louvre 17 is turned about its pivotal axis 18 by the manipulator, the displacement movement of web 19 will also cause the other louvres 17 to be turned by a corresponding angle. By adjusting the louvres 17, the air stream coming from duct 1 may be directed that it can sweep the entire passenger space of the vehicle. The louvres 17 are of such a depth and are arranged at such a distance from each other, that when turned into the plane of FIG. 1, they completely shut off the area 6 for the fresh air line. In this way, ventilation of the passenger space through the fresh air line can be turned off.

Between the connecting branch 13 and frame 3 there is a chamber 21 which brings about a transition from the cross-section of the branch 13 to the area 6.

Frame 15 is pivotable upwards and downwards about axis 16 by a certain angle which may amount to about 30°. The result is that the air stream emerging between the louvres 17 is deflected upwards or downwards. Frame 15 is of such a depth that at maximum push-out angle, there is no aperture outside frame 15 (or only a very small one at the most) through which fresh air can escape. When the frame 15 is swivelled outwards, the main air stream will emerge in the direction of the swivel-out angle.

The air duct outlet described has the feature that the louvres 7 opposite to the heating line are directed towards the side window (not shown), whereas the louvres 17 opposite to the fresh-air line can be so adjusted that this air stream can be brought into any desired direction.

We claim:

1. A defroster and ventilation air outlet on the instrument panel of an automobile in proximity to the automobile's side window and adapted to distribute air into the automobile's passenger compartment comprising: a frame in the instrument panel of the automobile and partitioned into first and second outlet portions; said first and second outlet portions connected respectively to a heated air source and a fresh air source; fixed vertical louvers supported in said first outlet portion effective to direct heated air against the automobile's side window for defrosting the same; a frame mounted in said second outlet portion for pivotal movement therein about an axis; a plurality of parallel louvers mounted in said frame for pivotal movement about their longitudinal axes; a member normal to the axes of said louvers and connected to the latter for simultaneous pivoting of said louvers upon axial movement of said member; the axes of said louvers and the axis of said frame being substantially normal to one another to effect the discharge of air from said second outlet portion in alternate directions upon pivoting said frame and said louvers.

2. A defroster and ventilation air outlet on the instrument panel of an automobile in proximity to the automobile's side window and adapted to distribute air into the automobile's passenger compartment comprising: a frame in the instrument panel of the automobile and partitioned into first and second outlet portions; said first and second outlet portions connected respectively to a heated air source and a fresh air source; fixed vertical louvers supported in said first outlet portion effective to direct heated air against the automobile's side window for defrosting the same; a frame mounted in said second outlet portion for pivotal movement therein about an axis; a plurality of parallel louvers mounted in said frame for pivotal movement about their longitudinal axes; a member normal to the axes of said louvers and connected to the latter for simultaneous pivoting of said louvers upon axial movement of said member; the axes of said louvers and the axis of said frame being substantially normal to one another to effect the discharge of air from said second outlet portion in alternate directions upon pivoting said frame and said louvers; the depth of said pivotal frame being such that said frame can be pivoted approximately 30° from a central position without parting the edge of said frame from the periphery of said second outlet portion.

References Cited

UNITED STATES PATENTS

| | | | |
|---|---|---|---|
| 2,742,844 | 4/1956 | Steadman | 98—2.4 |
| 2,853,933 | 9/1958 | Betts | 98—2.4 |
| 3,252,398 | 5/1966 | First | 98—40V |

MARTIN P. SCHWADRON, Primary Examiner

W. C. ANDERSON, Assistant Examiner

U.S. Cl. X.R.

49—74, 77; 98—40